(12) United States Patent
Goto (10) Patent No.: US 8,967,731 B2
(45) Date of Patent: Mar. 3, 2015

(54) SPOKE ATTACHMENT STRUCTURE (75) Inventor: Masashi Goto, Osaka (JP)

(73) Assignee: Shimano Inc., Osaka (JP)

( * ) Notice: Subject to any disclaimer, the term of this patent is extended or adjusted under 35 U.S.C. 154(b) by 391 days.

(21) Appl. No.: 13/032,756

(22) Filed: Feb. 23, 2011

(65) Prior Publication Data
US 2012/0212036 A1 Aug. 23, 2012

(51) Int. Cl.
*B60B 21/06* (2006.01)
*B60B 1/04* (2006.01)

(52) U.S. Cl.
CPC ............... *B60B 21/066* (2013.01); *B60B 21/06* (2013.01); *B60B 21/062* (2013.01)
USPC .......................................................... 301/58

(58) Field of Classification Search
CPC ...... B60B 21/06; B60B 21/062; B60B 21/066
USPC .......................... 301/55, 58, 61, 104; 277/622
See application file for complete search history.

(56) References Cited

U.S. PATENT DOCUMENTS

| | | | | |
|---|---|---|---|---|
| 4,834,139 A * | 5/1989 | Fitzgibbons | ............. | 137/614.04 |
| 6,036,279 A | 3/2000 | Campagnolo | | |
| 6,641,227 B2 * | 11/2003 | LaCombe et al. | ............. | 301/58 |
| 6,679,563 B2 * | 1/2004 | Okajima | ................ | 301/67 |
| 6,776,460 B1 * | 8/2004 | Lo | ................... | 301/58 |
| 6,776,467 B2 * | 8/2004 | Yamazaki et al. | ................ | 347/7 |
| 7,137,671 B2 | 11/2006 | Passarotto et al. | | |
| 7,357,460 B2 * | 4/2008 | Schlanger | .................... | 301/104 |
| 7,588,253 B2 * | 9/2009 | Bottura | ........................ | 277/609 |
| 8,162,407 B2 * | 4/2012 | Mercat et al. | ................... | 301/58 |
| 2004/0155518 A1 | 8/2004 | Schlanger | | |
| 2005/0110333 A1 | 5/2005 | Tien | | |
| 2007/0057566 A1 * | 3/2007 | Cappellotto | .................... | 301/58 |
| 2007/0063575 A1 * | 3/2007 | Passarotto et al. | ............. | 301/58 |
| 2009/0184565 A1 * | 7/2009 | Mercat et al. | ................... | 301/58 |

FOREIGN PATENT DOCUMENTS

| | | | |
|---|---|---|---|
| CN | 1548306 U | | 11/2004 |
| DE | 10 2006 035 814 A1 | | 2/2008 |
| EP | 1 101 631 A1 | | 5/2001 |
| EP | 1 209 006 A1 | | 5/2002 |
| EP | 1264611 A1 | * | 12/2002 |
| EP | 2 368 722 A1 | | 9/2011 |
| JP | 61-182494 U | | 11/1986 |
| JP | 62-100324 U | | 6/1987 |
| JP | 2700775 B2 | | 10/1997 |
| JP | 10-244801 A | | 9/1998 |
| JP | 11-201131 A | | 7/1999 |
| JP | 2002-372023 A | | 12/2002 |
| JP | 2005-344751 A | | 12/2005 |
| TW | 547344 U | | 11/2003 |

(Continued)

OTHER PUBLICATIONS

European Search Report of corresponding EP Application No. 11 17 5288.7 dated Apr. 5, 2012.

*Primary Examiner* — Kip T Kotter
*Assistant Examiner* — Jean Charleston
(74) *Attorney, Agent, or Firm* — Global IP Counselors (57) ABSTRACT

A spoke attachment structure is provided with a main body and a cover member. The main body includes a tool engagement structure and an external thread. The cover member is disposed on an outer surface of the main body adjacent the external thread.

18 Claims, 8 Drawing Sheets

(56) References Cited

FOREIGN PATENT DOCUMENTS

| TW | 200940404 A | 10/2009 |
|---|---|---|
| TW | M378121 U1 | 4/2010 |
| TW | I404649 B | 11/2013 |
| WO | WO 0220338 A2 * | 3/2002 ............ 301/58 |
| WO | WO 2004/103729 * | 12/2004 |
| WO | WO 2004/103729 A1 | 12/2004 |
| WO | 2010/082155 A1 | 7/2010 |

* cited by examiner

SPOKE ATTACHMENT STRUCTURE

BACKGROUND

1. Field of the Invention

This invention generally relates to attachment of spokes to a bicycle rim. More specifically, the present invention relates to spoke attachment structures for attaching tensioned spokes to a bicycle rim.

2. Background Information

Bicycle wheels are continually undergoing design modifications to make them easier to manufacture and assemble, as well as stronger, lighter and more aerodynamic. Various types of bicycle wheels are being sold on the market at present. Many bicycle wheels include a hub, a plurality of spokes and an annular rim. The hub is rotatably mounted to a part of the bicycle frame. The inner end of each spoke is connected to the hub and the spokes extend outward from the hub. The annular rim is connected to the outer ends of the spokes and includes an outer circumferential part that supports a pneumatic tire.

In general, the spokes of a bicycle wheel are thin wire spokes. A flange that connects the spokes to the hub is normally formed at both ends of the hub. Specifically, for example, holes are formed in the hub flanges for receiving the inner ends of the spokes. The interior end of each spoke is supported in a hole formed in one hub flange. In general, the outer end of each spoke is threaded such that the outer end can engage with a spoke nipple that secures the outer end of the wire spoke to the rim hole. By turning the spoke nipples, the tension in the spokes can be adjusted to the proper tension. However, sometimes during riding, the threaded connection between the spoke nipple and the outer end of the wire spoke can loosen such that slack (i.e., reduced tension) can occur in the spokes. To prevent of slack from occurring in the spokes, spoke attachment structures have been developed with a portion having increased friction. One example of such a spoke attachment structure is disclosed in U.S. Pat. No. 7,137,671 in which a plastic ring is disposed inside of a spoke attachment element for engaging the thread of the spoke. Another example of such a spoke attachment structure is disclosed in European Patent Publication No. 1,101,631 in which a friction portion is located in the threaded portion of a spoke attachment element. While these spoke attachment structures might be able to prevent slack (i.e., reduced tension) from occurring in the spokes, these spoke attachment structures can be difficult and/or costly to manufacture.

SUMMARY

One aspect of this disclosure is to provide a spoke attachment structure that effectively prevents slack (i.e., reduced tension) from occurring in the spokes.

Another aspect of this disclosure is to provide a spoke attachment structure that is relatively easy and inexpensive to manufacture.

In view of the state of the known technology, a spoke attachment structure is provided that basically comprises a main body and a cover member. The main body includes a tool engagement structure and an external thread. The cover member is disposed on an outer surface of the main body adjacent the external thread.

These and other objects, features, aspects and advantages of the bicycle spoke attachment structure will become apparent to those skilled in the art from the following detailed description, which, taken in conjunction with the annexed drawings, discloses illustrated embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
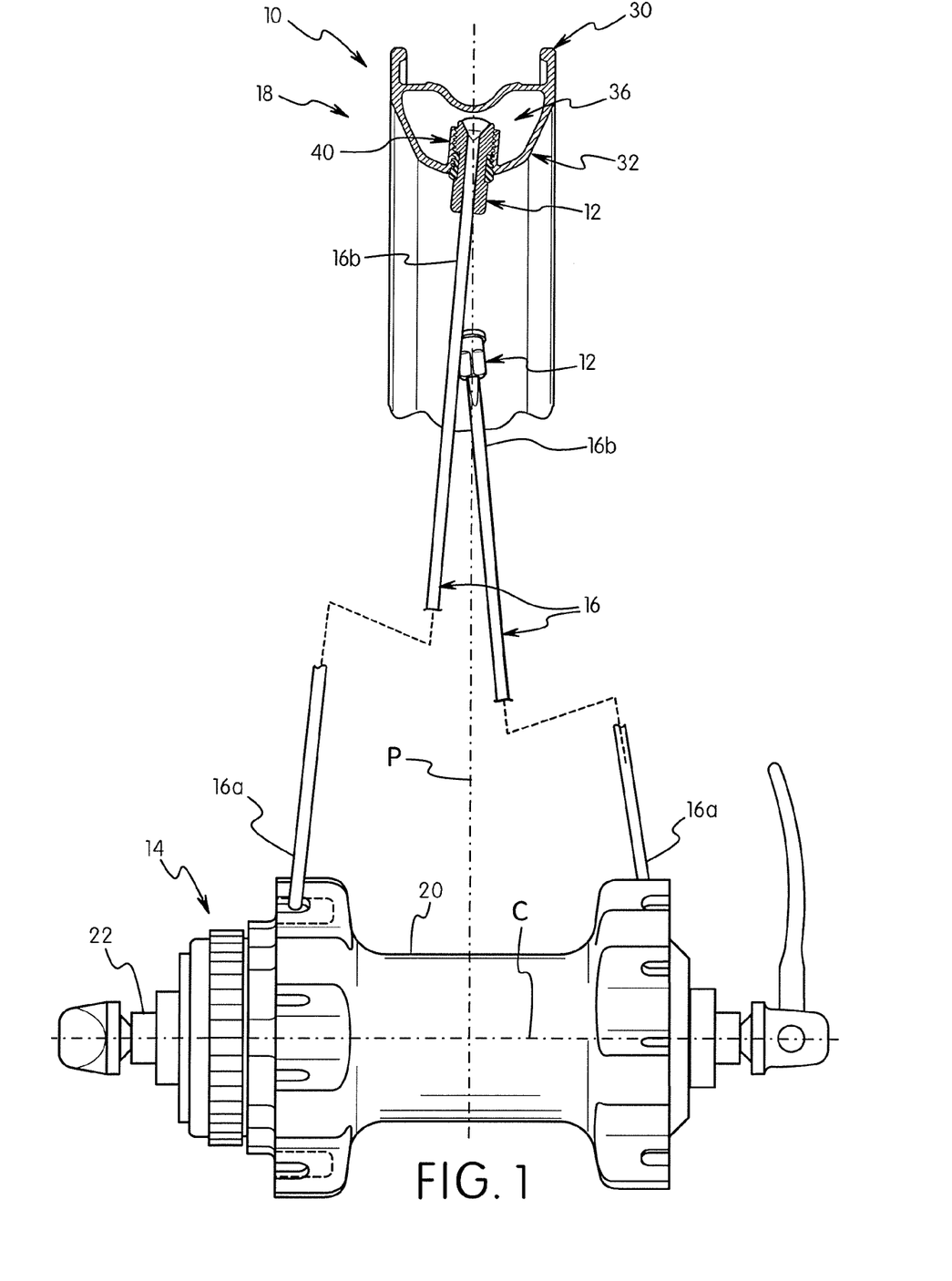
FIG. 1 is a transverse cross sectional view of a portion of a front wheel with a plurality of spoke attachment structures in accordance with a first illustrated embodiment.
Figure 2:
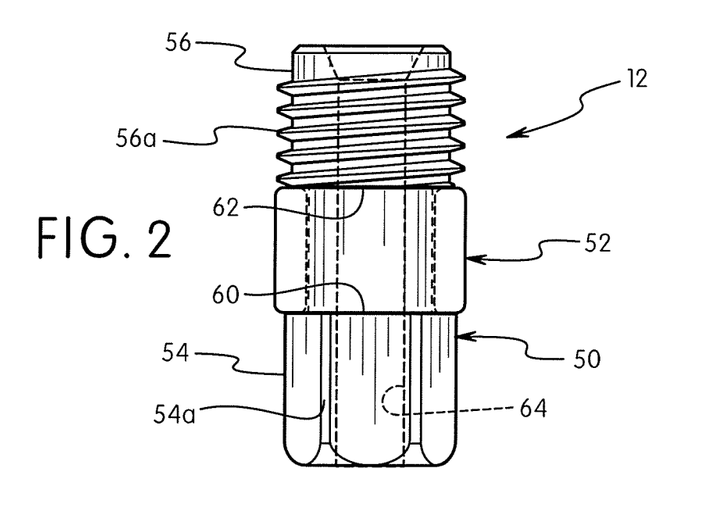
FIG. 2 is an elevational view of one of the spoke attachment structures of the bicycle rim illustrated in FIG. 1.
Figure 3:
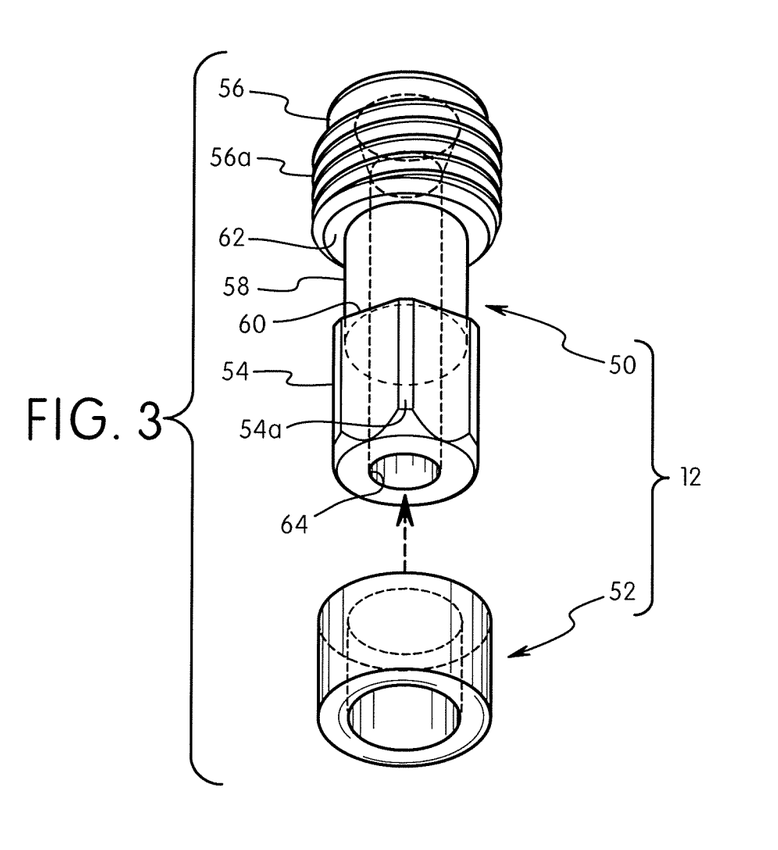
FIG. 3 is an exploded elevational view of the main body and the cover member of the spoke attachment structure illustrated in FIG. 2.

Referring initially to FIG. 1, a portion of a tensioned spoke bicycle wheel 10 is illustrated with a plurality of spoke attachment structures 12 (only two shown) in accordance with a first illustrated embodiment. The bicycle wheel 10 basically includes a center hub 14, a plurality of spokes 16 and a bicycle rim 18. The hub 14 is connected to the rim 18 by the spokes 16, which are placed under tension by the spoke attachment structures 12 as explained below. Basically, the spoke attachment structure 12 constitutes a form of a spoke nipple for adjusting tension in the spokes 16. A tire (not shown) is attached to the outer periphery of the rim 18. The hub 14, the spokes 16 and the rim 18 are conventional parts, and thus, the hub 14, the spokes 16 and the rim 18 will only be briefly explained herein. The bicycle wheel 10 is a clincher tire wheel in which that an air tight chamber is formed between the outer surface of the rim 18 and the pneumatic tire. Of course, it will be apparent to those skilled in the art from this disclosure that the rim 18 can be adapted to a tubeless tire wheel as needed and/or desired.

First, the hub 14 will be briefly discussed with reference to FIG. 1. The hub 14 is a relatively conventional hub, which basically includes a cylindrical hub shell 20 rotatably supported on a hub axle 22 by a pair of bearings (not shown). The hub axle 22 defines a center rotational axis C of the bicycle wheel 10 and the rim 18. In the embodiment illustrated, the hub 14 is a front bicycle hub. However, it will be apparent to those skilled in the bicycle field from this disclosure that the hub 14 can be replaced with a rear hub, as needed and/or desired.

The spokes 16 will now be explained with reference to FIG. 1. The spokes 16 are all preferably identical to each other. The spokes 16 are preferably integrally formed as a one-piece, unitary single member (integral member) using conventional manufacturing techniques. In the embodiment illustrated, the spokes 16 are tangential spokes that connect the hub 14 to the rim 18. Each spoke 16 basically includes an inner end 16a and an outer end 16b. Each of the outer ends 16b of the spokes 16 has a flange or enlarged part for engaging one of the spoke attachment structures 12. In the embodiment illustrated, a total of twenty-four tangential spokes 16 are used. Naturally, it will be apparent to those skilled in the bicycle field from this disclosure that the bicycle wheel 10 can have fewer or more spokes and/or a different spoking arrangement (e.g., all radial spokes, or a combination of tangential spokes and radial spokes) as needed and/or desired.

Still referring to FIG. 1, the rim 18 and its connection to the spokes 16 will now be discussed in more detail. The rim 18 is essentially a circular metal member that is attached to the outer ends 16b of the spokes 16 by the spoke attachment structures 12. The rim 18 basically includes an annular tire mounting part 30 and an annular spoke mounting part 32 that form a tubular rim. However, the spoke attachment structures 12 can be used with any type of rim that can threadedly receive the spoke attachment structures 12. In the first illustrated embodiment, the annular tire mounting part 30 and the annular spoke mounting part 32 are formed as a one-piece, unitary member from as suitable metal such as an aluminum alloy. The spoke mounting part 32 extends from the annular tire mounting part 30 to define an interior space 36 with a predetermined interior shape.

Figures 4, 5, 6, 7:
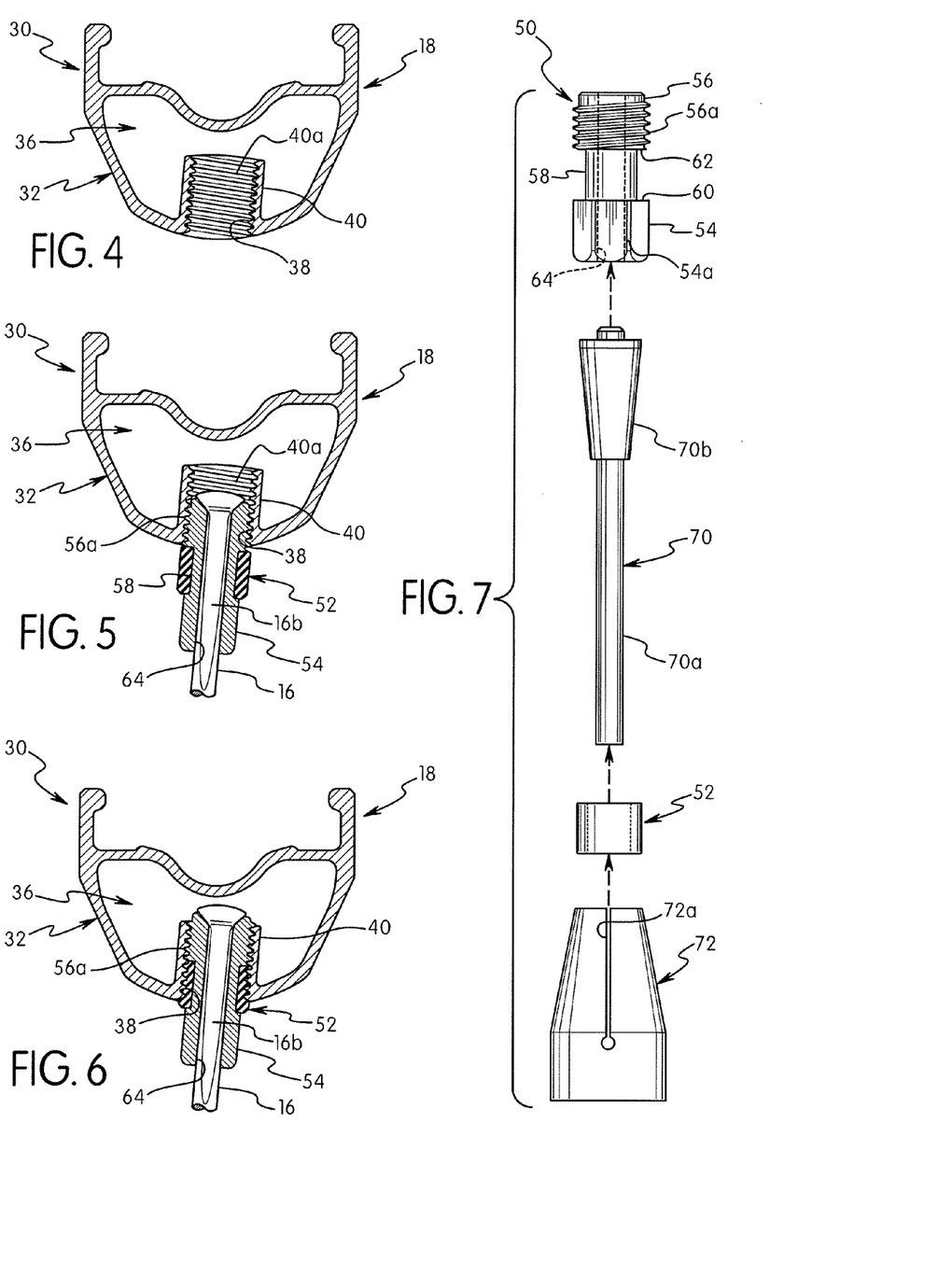
FIG. 4 is an enlarged transverse cross-sectional view of a portion of the bicycle rim illustrated in FIG. 2 with the spoke attachment structure removed.
FIG. 5 is an enlarged transverse cross-sectional view of a portion of the bicycle rim illustrated in FIG. 2 with the spoke attachment structure partially installed to the rim.
FIG. 6 is an enlarged transverse cross-sectional view of a portion of the bicycle rim illustrated in FIG. 2 with the spoke attachment structure fully installed to the rim.
FIG. 7 is an exploded elevational view of one of the spoke attachment structures illustrated in FIGS. 1 to 3 with an installation tool for installing the cover member onto the main body.

As best seen in FIG. 4, the annular spoke mounting part 32 has a plurality of spoke openings 38 that corresponds to the number of the spokes 16. The spoke openings 38 are disposed at predetermined locations along a circumferential direction of the annular spoke mounting part 32. In the first illustrated embodiment, the annular tire mounting part 30 has a plurality of spoke attachment tubes 40. The spoke attachment tubes 40 are aligned with the spoke openings 38, respectively. The spoke attachment tubes 40 have an internal thread 40a for adjustably receiving the spoke attachment structures 12, respectively, as discussed below. While the spoke attachment tubes 40 are illustrated as being a unitary part of the annular spoke mounting part 32, it will be apparent from this disclosure that the spoke attachment tubes 40 can be separate members that are attached to the annular spoke mounting part 32 at the spoke openings 38.

The spoke attachment tubes 40 in the annular spoke mounting part 32 are angled so that their center axes form acute angles with respect to a center plane P of the rim 18, which extends perpendicularly from the center rotational axis C of the bicycle wheel 10 and bisects the rim 18 into two halves. In particular, the spoke attachment tubes 40 are angled with respect to the center plane P by about five to six degrees in an alternating manner. In particular, the angles of the spoke openings 38 are arranged so that the center axes of the spoke attachment tubes 40 alternate in opposite directions relative to the center plane P of the rim 18. In other words, every other one of the spoke attachment tubes 40 have their center axes tilted to a first side of the center plane P, and the other spoke attachment tubes 40 have their center axes tilted to a second side of the center plane P.

In the first illustrated embodiment, the spoke attachment structure 12 basically includes a main body 50 and a cover member 52. The cover member 52 is attached on an outer surface of the main body 50 for engaging the internal thread 40a of one of the spoke attachment tubes 40. Basically, the main body 50 is configured and arranged to be threadedly secured within the spoke attachment tubes 40 of the rim 18, while the cover member 52 configured and arranged to engage the spoke attachment tubes 40 of the rim 18 for preventing of slack from occurring in the spokes 16. In other words, the main body 50 constitutes a threaded portion of the spoke attachment structure 12, while the cover member 52 constitutes a friction increasing portion of the spoke attachment structure 12. In particular, the cover member 52 acts to increase friction between the spoke attachment structure 12 and the spoke attachment tubes 40 of the rim 18.

In the first illustrated embodiment, the main body 50 is a one-piece, unitary member formed of a hard rigid material such as aluminum, or a fiber reinforced plastic (FRP), or a resin with carbon fibers. The main body 50 includes a first body portion 54, a second body portion 56 and a third body portion 58. The first body portion 54 has a non-cylindrical outer surface 54a with a hexagonal cross sectional profile that constitutes a tool engagement structure. The second body portion 56 has an external thread 56a that threadedly engages the internal thread 40a of one of the spoke attachment tubes 40. The third body portion 58 is axially disposed between the first and second body portions 54 and 56. In particular, the third body portion 58 is an annular recess that is defined by a pair of axially spaced abutments 60 and 62. The third body portion 58 is configured and arranged to receive the cover member 52 with the abutments 60 and 62 preventing longitudinal movement of the cover member 52 along the main body 50. In other words, the cover member 52 is disposed on the outer surface of the third body portion 58 of the main body 50 adjacent the external thread 56a.

The main body 50 also includes a spoke receiving hole 64 that is configured to receive one of the spokes 16 therein. In the first illustrated embodiment, the spoke receiving hole 64 is a through bore that extends completely through the main body 50. By rotating the main body 50, the external thread 56a threadedly engages the internal thread 40a of one of the spoke attachment tubes 40 to adjust the tension in the spoke 16.

In the first illustrated embodiment, the cover member 52 is basically a cylindrical sleeve that is deformable. For example, the cover member 52 (e.g., the sleeve) is made from resin material (e.g. heat resistant urethane or silicon) having a Shore hardness in a range of 00-60 to 00-90. Thus, the cover member 52 is an elastically deformable member. Also, since the rim 18 can become heated during braking, the cover member 52 is made from a material with a heatproof characteristic such that the cover member 52 does not deteriorate from the heat resulting from braking.

In the first illustrated embodiment, the cover member 52 has an outer diameter that is equal to or slightly less than a maximum diameter of the external thread 56a. Also preferably, the cover member 52 has an outer diameter that is greater than a minimum diameter of the external thread 56a. In this way, the cover member 52 engages the internal thread 40a of one of the spoke attachment tubes 40 upon threading the main body 50 into one of the spoke attachment tubes 40. The cover member 52 has a wall thickness about one millimeter in the first illustrated embodiment.

Also preferably, the cover member 52 has an inner diameter that is dimensioned relative to the diameter of the third body portion 58 of the main body 50 such that cover member 52 is prestressed against the outer surface of the third body portion 58 of the main body 50. In other words, the cover member 52 has an inner diameter before being place over the third body portion 58 of the main body 50 that is smaller than the outer diameter of the third body portion 58 of the main body 50.

In the first illustrated embodiment, the cover member 52 is located only on the third body portion 58 of the main body 50. The cover member 52 does not overlie the external thread 56a. Also the cover member 52 is disposed on the outer surface of the third body portion 58 of the main body 50 adjacent the external thread 56a. The abutments 60 and 62 prevent longitudinal movement of the cover member 52 along the main body 50.

Referring now to FIGS. 7 to 12, one possible installation procedure for installing the cover member 52 onto the main body 50 will now be discussed. Of course, other installation procedures can be used as needed and/or desired. In the first illustrated embodiment, a sleeve expanding tool 70 and a sleeve pushing tool 72 is used for installing the cover member 52 onto the main body 50. The sleeve expanding tool 70 has a rod portion 70a and a tapered portion 70b disposed on the rod portion 70a.

Figures 8, 9:
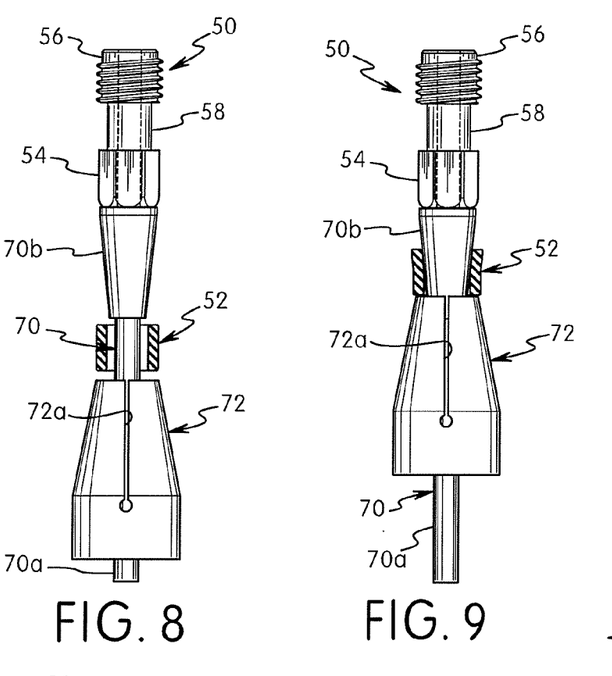
FIG. 8 is an elevational view of the spoke attachment structure and the installation tool illustrated in FIG. 7 with the cover in an initial position on the installation tool for installing the cover member onto the main body.
FIG. 9 is an elevational view of the spoke attachment structure and the installation tool illustrated in FIGS. 7 and 8 with the cover being expanded in a radial direction on the installation tool prior to installation of the cover member onto the main body.
Figure 10:
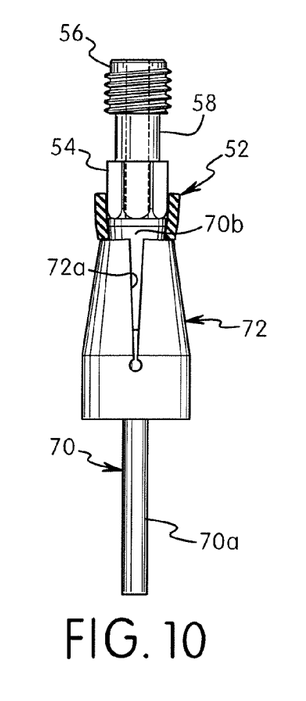
FIG. 10 is an elevational view of the spoke attachment structure and the installation tool illustrated in FIGS. 7 to 9 with the cover being partially pushed onto the main body.
Figure 11:
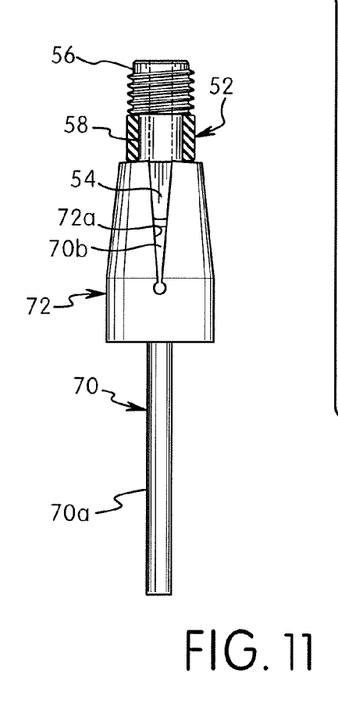
FIG. 11 is an elevational view of the spoke attachment structure and the installation tool illustrated in FIGS. 7 to 10 with the cover being fully installed onto the main body.
Figure 12:
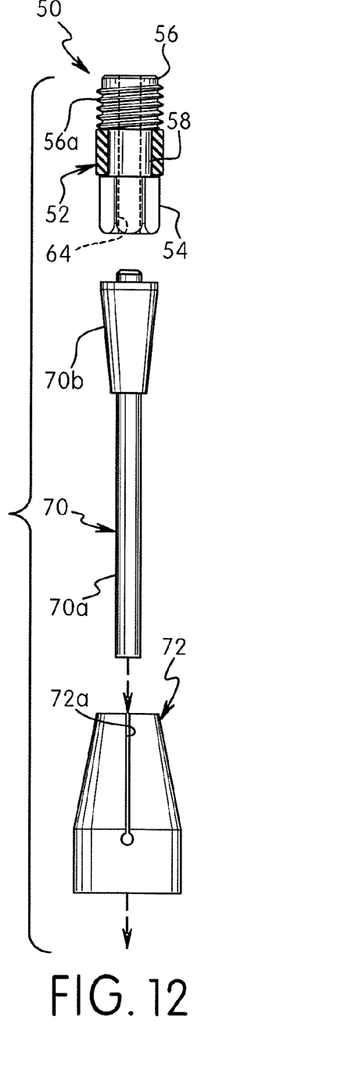
FIG. 12 is an elevational view of the spoke attachment structure and the installation tool illustrated in FIGS. 8 to 13 with the cover being fully installed onto the main body and the installation tool separated from the spoke attachment structure.

As seen in FIG. 8, the cover member 52 is first placed on the rod portion 70a of the sleeve expanding tool 70, and then the sleeve pushing tool 72 is placed on the rod portion 70a of the sleeve expanding tool 70. As seen in FIG. 9, the sleeve pushing tool 72 is pushed axially along the rod portion 70a such that the cover member 52 is forced on the tapered portion 70b, which causes the cover member 52 to be elastically stretched to a larger diameter. Then, as seen in FIG. 10, the sleeve pushing tool 72 is pushed further axially along the rod portion 70a such that the cover member 52 is forced on the non-cylindrical outer surface 54a (hexagonal cross sectional profile) of the first body portion 54 that constitutes a tool engagement structure. The sleeve pushing tool 72 has longitudinal slits 72 (only one shown) that allow the sleeve pushing tool 72 to expand as the sleeve pushing tool 72 rides along the tapered portion 70b. Then, as seen in FIG. 11, the sleeve pushing tool 72 is pushed further axially along the tapered portion 70b such that the cover member 52 is forced on the third body portion 58 of the main body 50. Now, as seen in FIG. 12, the sleeve expanding tool 70 and the sleeve pushing tool 72 can be removed from the spoke attachment structure 12.

Referring to now to FIGS. 13 to 20, a spoke attachment structure 112 is illustrated for use with the rim 18 in accordance with a second illustrated embodiment. Here, the spoke attachment structure 112 includes a cover member 152 that is used with the main body 50 of the first illustrated embodiment. Basically, the cover member 152 is a tubular sleeve that is made of a hard plastic material such as polyoxymethylene (POM), which are also known as acetal, polyacetal and polyformaldehyde. Also, since the rim 18 can become heated during braking, the cover member 152 is made from a material with a heatproof characteristic such that the cover member 152 does not deteriorate from the heat resulting from braking. Since the cover member 152 is made of a harder material than the cover member 52, the cover member 152 is preferably a split ring with a longitudinal slot 152a extending in an axial direction. In this way, the cover member 152 can be installed in a radial on the third body portion 58 of the main body 50.

Figures 13, 14, 15, 16, 17:
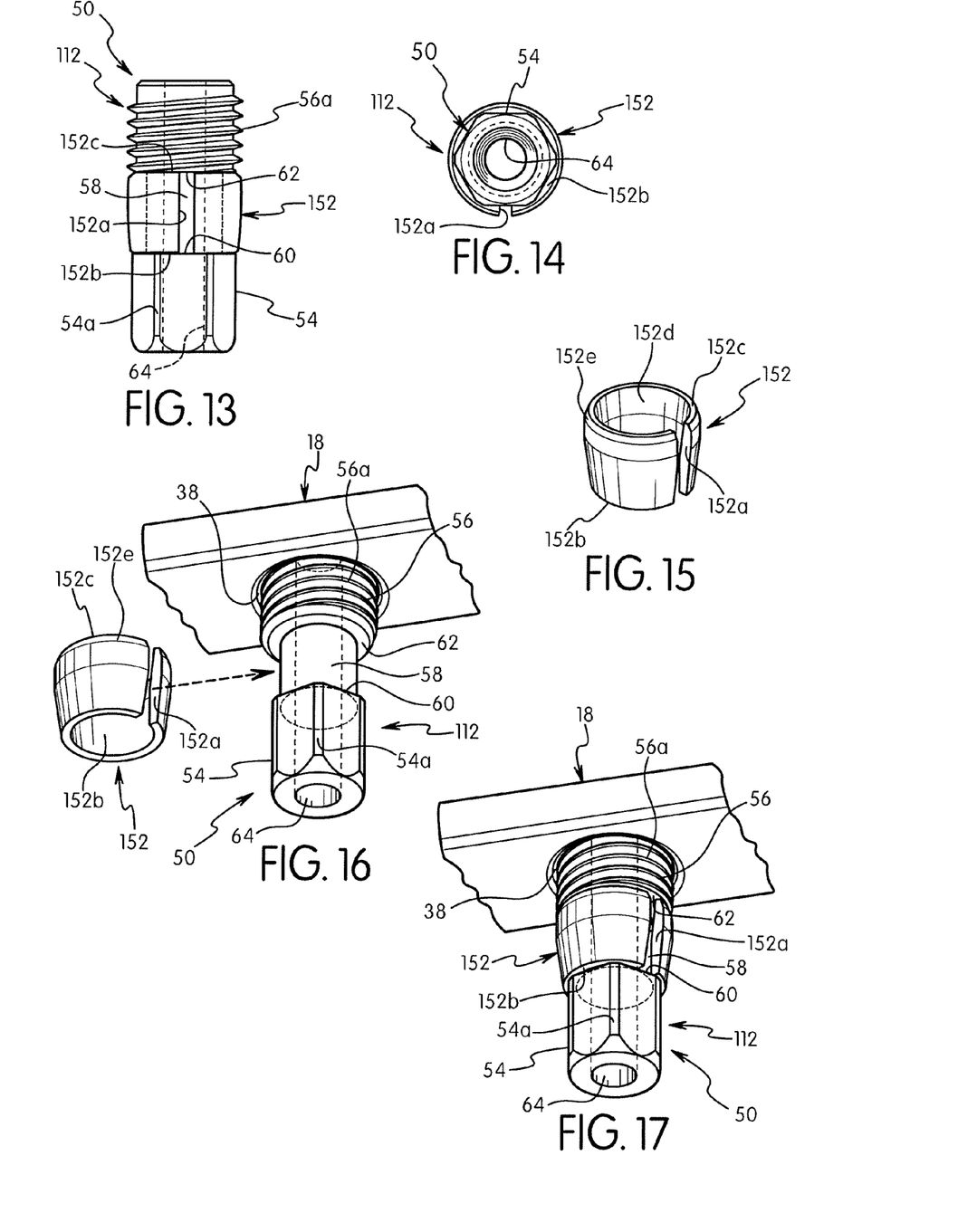
FIG. 13 is an elevational view of a spoke attachment structure for the bicycle rim illustrated in FIG. 1 in accordance with a second illustrated embodiment.
FIG. 14 is an axial end view of the spoke attachment structure illustrated in FIG. 13 in accordance with the second illustrated embodiment.
FIG. 15 is a perspective view of the cover member of the spoke attachment structure illustrated in FIGS. 13 and 14.
FIG. 16 is an exploded perspective view of the spoke attachment structure illustrated in FIGS. 13 and 14 with the main body threaded into a spoke opening in the rim and prior to the cover member being installed onto the main body.
FIG. 17 is a perspective view of the spoke attachment structure illustrated in FIGS. 13 to 16 with the main body threaded into the spoke opening in the rim and the cover member fully installed onto the main body.
Figure 18:
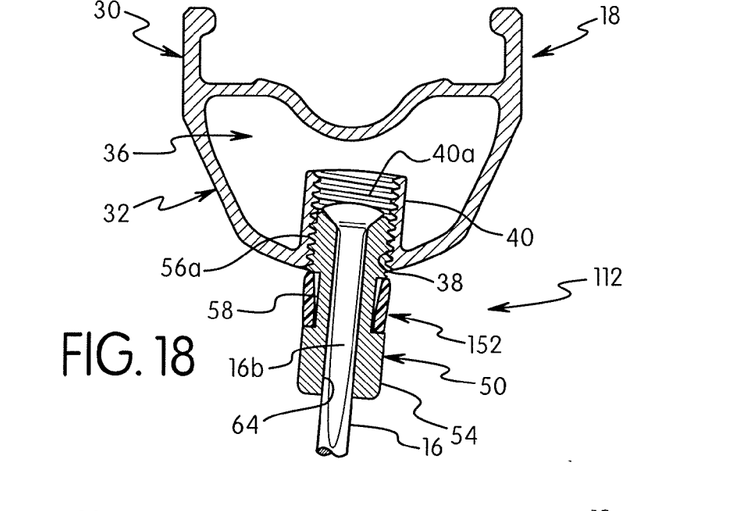
FIG. 18 is a transverse cross-sectional view of a portion of the bicycle rim illustrated in FIG. 2 with the spoke attachment structure of FIGS. 13 to 17 partially threaded into one of the spoke openings in the rim.

As best see in FIGS. 15 and 16, the cover member 152 has a first open end 152b and a second open end 152c. The first open end 152b is disposed adjacent the tool engagement structure 54 and contacts the abutment 60. The second open end 152c is disposed adjacent the external thread 56a and contacts the abutment 62. The cover member 152 further has a tapered inside surface 152d such that the first open end 152b has a smaller diameter than the second open end 152c. Thus, the second open end 152c constitutes a larger diameter end of the cover member 152 and the first open end 152b constitutes a smaller diameter end of the cover member 152. In the illustrated embodiment, the outer surface of the larger diameter end 152c is a chamfered section 152e located adjacent the external thread 56a. The chamfered section 152e tapers inward at about 10° to aid in the insertion of the cover member 152 into the spoke opening 38. The angle of the taper of the chamfered section 152e is not limited to about 10°.

Figure 19:
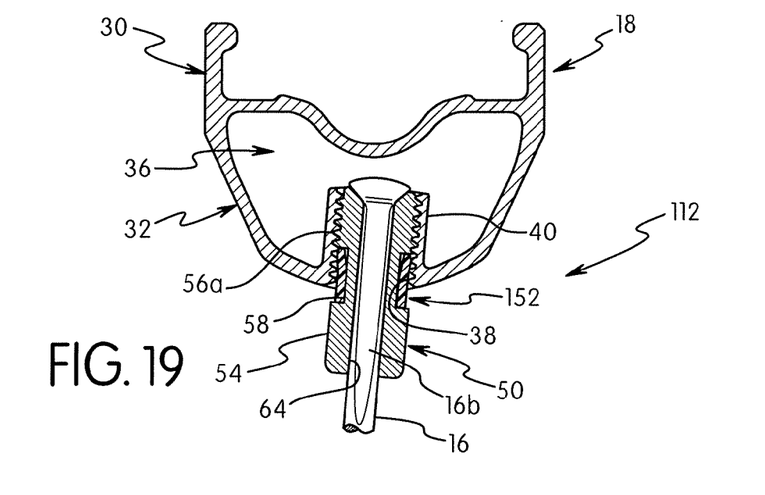
FIG. 19 is a transverse cross-sectional view of a portion of the bicycle rim illustrated in FIG. 2 with the spoke attachment structure of FIGS. 13 to 18 fully threaded into the spoke opening in the rim.
Figure 20:
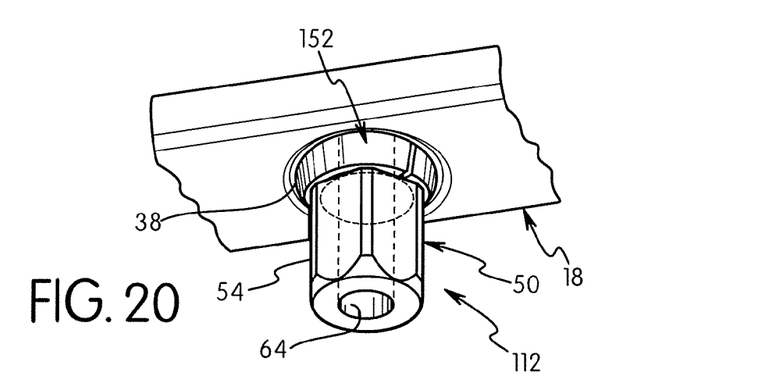
FIG. 20 is a partial perspective view of the spoke attachment structure illustrated in FIGS. 13 to 18 with the spoke attachment structure fully threaded into the spoke opening in the rim.
Figures 21, 22, 23:
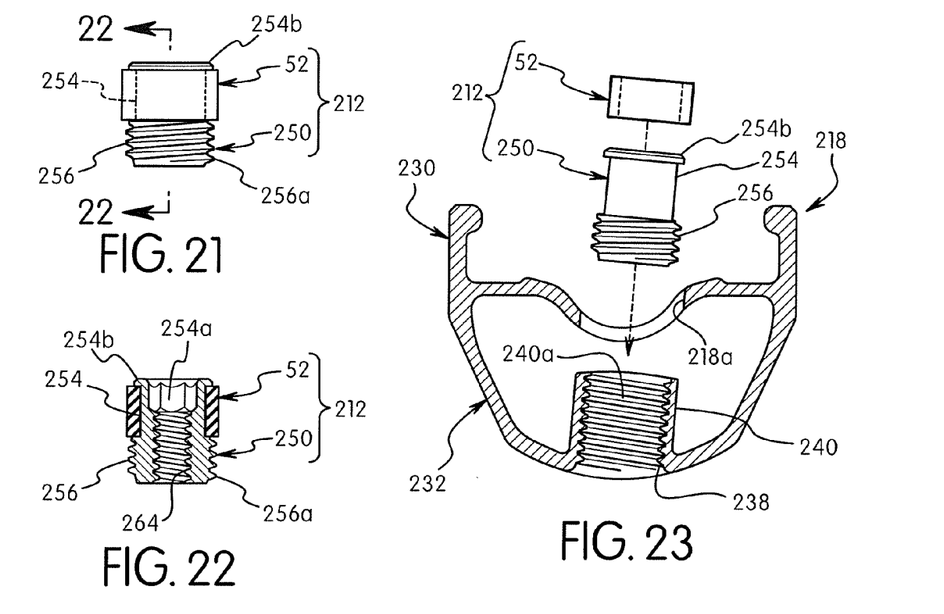
FIG. 21 is an elevational view of a spoke attachment structure a spoke attachment structure in accordance with a third embodiment.
FIG. 22 is a cross-sectional view of the spoke attachment structure illustrated in FIG. 21 as seen along section line 22-22 of FIG. 21.
FIG. 23 is a transverse cross-sectional view of a portion of a bicycle rim and an exploded elevational view of the spoke attachment structure in illustrated in FIGS. 21 and 22.
Figure 24:
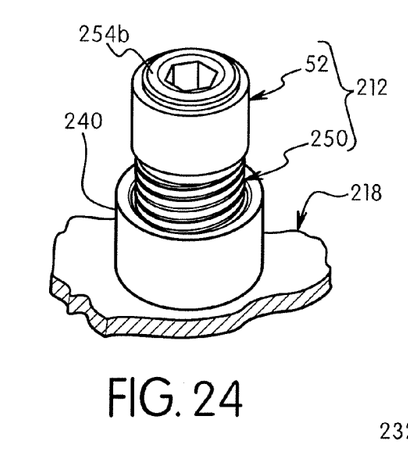
FIG. 24 is a perspective view of the spoke attachment structure illustrated in FIGS. 21 to 23 with the main body threaded into the spoke opening in the rim and the cover fully installed onto the main body in accordance with the third embodiment.
Figure 25:
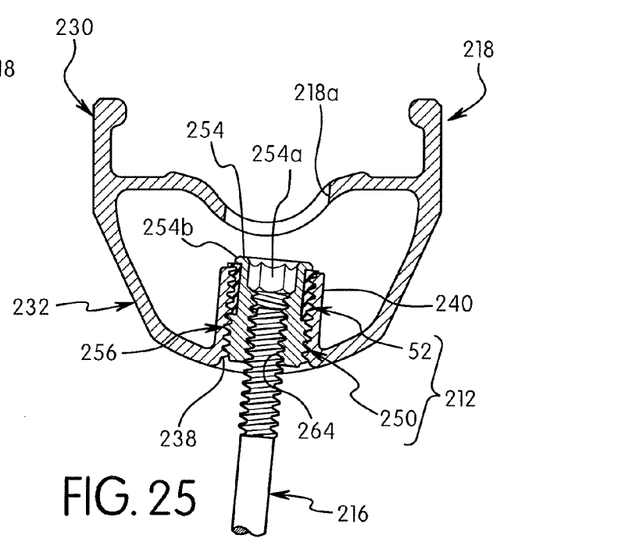
FIG. 25 is a transverse cross-sectional view of a portion of the bicycle rim with the spoke attachment structure illustrated in FIGS. 21 to 24 fully threaded into the spoke opening in the rim in accordance with the third embodiment.

When the spoke attachment structure 12 is threaded into the spoke attachment tubes 40 of the rim 18, the larger diameter end 152c is squeezed radially inward and pushed axially by the spoke opening 38 of the rim 18. In other words, the cover member 152 is preferably dimensioned with respect to the internal thread 40a such that the internal thread 40a does not deform the outer surface of the cover member 152 during installation. Rather, the outer surface of the cover member 152 is radially squeezed to the minimum internal diameter of the internal thread 40a during installation as seen in FIG. 19. In this way, a radial force is applied between the internal thread 40a and the larger diameter end 152c of the cover member 152 and the third portion 58 and the smaller diameter end 152b of the cover member 152 such that friction is increased between the cover member 152 and both the internal thread 40a and the third portion 58. Also, an axial force is placed on the cover member 152 during installation such that the cover member 152 is pushed against the abutment 60. However, it is not necessary for the cover member 152 to be pushed against the abutment 60, because of the increased friction occurring between the cover member 152 and both the internal thread 40a and the third portion 58.

Referring to now to FIGS. 21 to 25, a spoke attachment structure 212 is illustrated for use with a rim 218 in accordance with a third illustrated embodiment. Here, the spoke attachment structure 212 includes a main body 250 that is used in conjunction with the cover member 52 of the first illustrated embodiment. The rim 218 is basically the same as the rim 18, discussed above, except that openings 218a are provided in the rim 218 for accessing the spoke attachment structures 212. Thus, the rim 218 includes an annular tire mounting part 230 and an annular spoke mounting part 232 that form a tubular rim with a plurality of spoke openings 23 that corresponds to the number of spokes 216 (only one shown).

Basically, the main body 250 of this third embodiment includes a first body portion 254 and a second body portion 256. Also a threaded spoke receiving hole 264 extends axially in the main body 250 for receiving a threaded end of the spoke 216 therein. The first body portion 254 has a non-cylindrical bore 254a with a hexagonal cross sectional profile that constitutes a tool engagement structure. The outer surface of the first body portion 254 is configured and arranged to receive the cover member 52 such that the cover member 52 is located on the first body portion 254 between an end flange 254b and the second body portion 256. Thus, the cover member 52 at least partially overlies the non-cylindrical bore 254a (e.g., the tool engagement structure 54). The second body portion 256 has an external thread 256a that threadedly engages the internal thread 240a of a spoke attachment tube 240 of the rim 218, similar to the prior embodiment. Basically, the main body 250 is configured and arranged to be threadedly secured within the spoke attachment tube 240 of the rim 218, while the cover member 52 configured and arranged to engage the internal thread 240a of the spoke attachment tube 240 of the rim 218 for preventing of slack from occurring in the spokes 216. In other words, the main body 250 constitutes a threaded portion of the spoke attachment structure 212, while the cover member 52 constitutes a friction increasing portion of the spoke attachment structure 212. In particular, the cover member 52 acts to increase friction between the spoke attachment structure 212 and the spoke attachment tube 240 of the rim 218 in a similar manner as the first embodiment. In view of the similarities between the first and third embodiments, the spoke attachment structure 212 will not be discussed in further detail.

Figure 26:
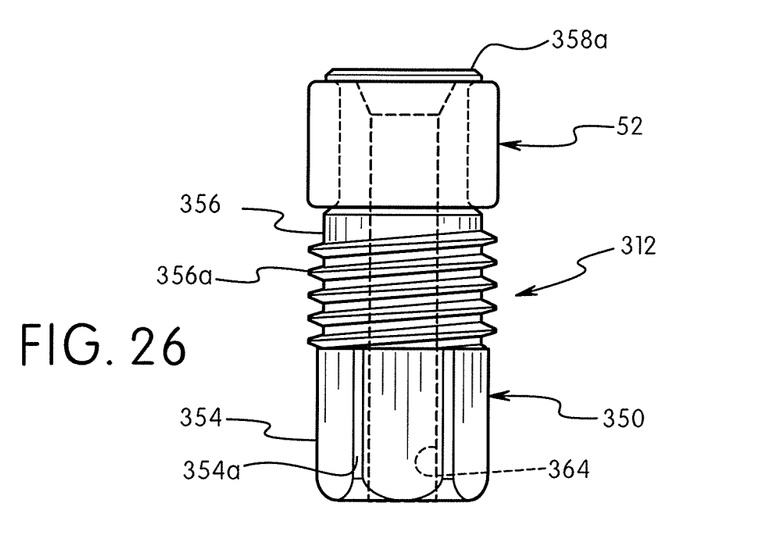
FIG. 26 is an elevational view of a spoke attachment structure in accordance with a fourth embodiment.
Figure 27:
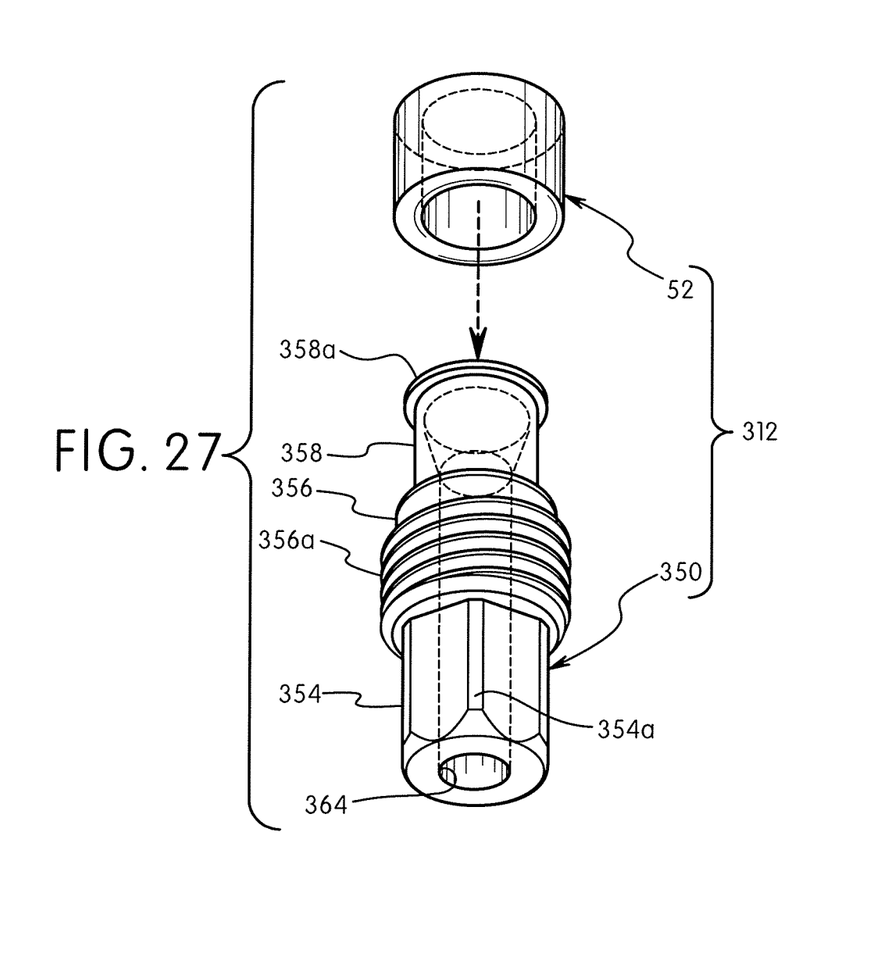
FIG. 27 is an exploded perspective view of the spoke attachment structure illustrated in FIG. 26 in accordance with the fourth embodiment.

Referring to now to FIGS. 26 and 27, a spoke attachment structure 312 is illustrated for use with the rim 18 in accordance with a fourth illustrated embodiment. Here, the spoke attachment structure 312 includes a main body 350 that is used in conjunction with the cover member 52 of the first and third illustrated embodiments. Basically, the main body 350 of this fourth embodiment includes a first body portion 354, a second body portion 356 and a third body portion 358. Also a spoke receiving hole 364 extends axially through the main body 350 for receiving one of the spokes 16 therein.

The only difference between the main body 350 of the fourth illustrated embodiment and the main body 50 of the first illustrated embodiment is the arrangement of the body portions. Here, in this fourth embodiment, the second body portion 356 is axially disposed between the first and third body portions 354 and 358. The first body portion 354 has a non-cylindrical outer surface 354a with a hexagonal cross sectional profile that constitutes a tool engagement structure. The outer surface of the third body portion 358 is configured and arranged to receive the cover member 52 such that the cover member 52 is located on the third body portion 358 between an end flange 358a and the second body portion 356. The second body portion 356 has an external thread 356a that threadedly engages the internal thread 40a of a spoke attachment tube 40 of the rim 18, similar to the first embodiment. Basically, the main body 350 is configured and arranged to be threadedly secured within the spoke attachment tube 40 of the rim 18, while the cover member 52 configured and arranged to engage the internal thread 40a of the spoke attachment tube 40 of the rim 18 for preventing of slack from occurring in the spokes 16. In other words, the main body 350 constitutes a threaded portion of the spoke attachment structure 312, while the cover member 52 constitutes a friction increasing portion of the spoke attachment structure 312. In particular, the cover member 52 acts to increase friction between the spoke attachment structure 312 and the spoke attachment tube 40 of the rim 18 in a similar manner as the first embodiment. In view of the similarities between the first and fourth embodiments, the spoke attachment structure 312 will not be discussed in further detail.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "circumferential", "radial", "axial", "width", "inner", "outer", and "transverse" as well as any other similar directional terms refer to those directions with respect to a center axis of rotation of the bicycle rim. Finally, terms of degree such as "substantially", "about" and "approximately" as used herein mean a reasonable amount of deviation of the modified term such that the end result is not significantly changed, e.g., manufacturing tolerances.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A spoke attachment structure comprising:
   a main body having a first axial end and a second axial end, the main body including a tool engagement structure, an external thread, and a spoke receiving hole, die spoke receiving hole being a bore that extends completely through the main body, the tool engagement structure and die external thread being fixed with respect to each other in an axial direction of the external thread; and
   a cover member disposed on an outer circumferential surface of the main body, the outer circumferential surface being disposed between the first axial end and the second axial end of the main body, the cover member being adjacent the external thread without overlying the external thread.

2. The spoke attachment structure according to claim 1, wherein
   the main body includes a first body portion having the tool engagement structure, a second body portion having the external thread and a third body portion having the cover member.

3. The spoke attachment structure according to claim 2, wherein
   the second body portion is axially disposed between the first and third body portions.

4. The spoke attachment structure according to claim 1, wherein
   the cover member includes a sleeve that is deformable.

5. The spoke attachment structure according to claim 4, wherein
   the sleeve has an outer diameter that is greater than a minimum diameter of the external thread.

6. The spoke attachment structure according to claim 4, wherein
   the sleeve is prestressed against the outer surface of the main body.

7. The spoke attachment structure according to claim 4, wherein
   the sleeve is a split ring with a longitudinal slot extending in an axial direction.

8. The spoke attachment structure according to claim 4, wherein
   the sleeve has a first open end disposed adjacent the tool engagement structure and a second open end disposed adjacent the external thread, the sleeve further has a tapered inside surface such that the first open end has a smaller diameter than the second open end.

9. The spoke attachment structure according to claim 4, wherein
   the sleeve has a first open end disposed adjacent the tool engagement structure and a second open end disposed adjacent the external thread, the sleeve has an outer surface with a tapered section that tapers towards the first open end.

10. The spoke attachment structure according to claim 9, wherein
    the outer surface of the sleeve has a chamfered section adjacent the external thread.

11. The spoke attachment structure according to claim 4, wherein
    the sleeve does not overlie the external thread.

12. The spoke attachment structure according to claim 4, wherein
    the sleeve at least partially overlies the tool engagement structure.

13. The spoke attachment structure according to claim 4, wherein
    the sleeve is made from a resin material having a Shore hardness in a range of 00-60 to 00-90.

14. The spoke attachment structure according to claim 4, wherein
    the sleeve has an outer diameter that is equal to or less than a maximum diameter of the external thread.

15. A spoke attachment structure comprising:
    a main body including a first body portion having a tool engagement structure, a second body portion having an external thread, a third body portion axially disposed between the first and second body portions, and a spoke receiving hole provided as a bore that extends completely through the main body, the tool engagement structure and the external thread being fixed with respect to each other in an axial direction of the external thread; and
    a cover member disposed on an outer surface of the third body portion of the main body, the cover member being adjacent the external thread without overlying the external thread.

16. A spoke attachment structure comprising:
    a main body having a first axial end and a second axial end, the main body including a tool engagement structure and an external thread; and
    a cover member disposed on an outer circumferential surface of the main body adjacent the external thread, the outer circumferential surface being disposed between the first axial end and the second axial end of the main body, the cover member including a deformable sleeve having an outer diameter that is equal to or less than a maximum diameter of the external thread.

17. The spoke attachment structure according to claim 16, wherein
    the main body including a spoke receiving hole, the spoke receiving hole being a bore that extends completely through the main body.

18. A spoke attachment structure comprising:
    a main body including a tool engagement structure, an external thread, and a spoke receiving hole, the spoke receiving hole being a bore that extends completely through the main body, the tool engagement structure and the external thread being fixed with respect to each other in an axial direction of the external thread; and a cover member including a deformable sleeve disposed on an outer surface of the main body, the cover member being adjacent the external thread without overlying the external thread, the main body having a pair of axially spaced abutments preventing longitudinal movement of the sleeve along the main body.

* * * * *